(12) United States Patent
Ji et al.

(10) Patent No.: US 10,872,558 B2
(45) Date of Patent: Dec. 22, 2020

(54) IMAGE DISPLAY PROCESSING METHOD AND DEVICE, DISPLAY DEVICE AND NON-VOLATILE STORAGE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Zhihua Ji, Beijing (CN); Tiankuo Shi, Beijing (CN); Yilang Sun, Beijing (CN); Xiaomang Zhang, Beijing (CN); Yanhui Xi, Beijing (CN); Lingyun Shi, Beijing (CN); Wenyu Li, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/410,452

(22) Filed: May 13, 2019

(65) Prior Publication Data
US 2019/0355296 A1 Nov. 21, 2019

(30) Foreign Application Priority Data
May 18, 2018 (CN) .......................... 2018 1 0481562

(51) Int. Cl.
G09G 3/32 (2016.01)
G02F 1/13357 (2006.01)

(52) U.S. Cl.
CPC ......... *G09G 3/32* (2013.01); *G02F 1/133603* (2013.01); *G09G 2310/0264* (2013.01);
(Continued)

(58) Field of Classification Search
CPC ...... G09G 3/32; G09G 3/3426; G09G 3/3413; G09G 2310/0264; G09G 2320/0626;
(Continued)

(56) References Cited

U.S. PATENT DOCUMENTS 10,388,231 B2    8/2019  Zhou et al.
2018/0218690 A1* 8/2018  Zhou .................... G09G 3/3406
2018/0301097 A1  10/2018 Yoshida et al.

FOREIGN PATENT DOCUMENTS

CN    101352029 A    1/2009
CN    105390096 A    3/2016
(Continued)

OTHER PUBLICATIONS

First Chinese Office Action dated Aug. 12, 2019.

*Primary Examiner* — Alexander Eisen
*Assistant Examiner* — Kebede T Teshome
(74) *Attorney, Agent, or Firm* — Dilworth & Barrese, LLP.; Michael J. Musella, Esq.

(57) ABSTRACT

An image display processing method for a display device, an image display processing device, a display device, and a non-volatile storage medium are provided. The display device includes a backlight unit, and the backlight unit includes a plurality of display backlight blocks and is configured to be driven by a local dimming mode. The image display processing method includes: obtaining a peak driving threshold of an (s−1)-th frame of image based on respective backlight values of the plurality of backlight blocks of the (s−1)-th frame of image after a first local dimming process is performed on the (s−1)-th frame of image; obtaining respective adjusted backlight values of the plurality of backlight blocks of the s-th frame of image; and displaying the s-th frame of image by using the respective adjusted backlight values of the plurality of backlight blocks of the s-th frame of image.

16 Claims, 6 Drawing Sheets

(52) U.S. Cl.
CPC ............... *G09G 2320/0626* (2013.01); *G09G 2330/021* (2013.01)

(58) Field of Classification Search
CPC ......... G09G 2330/021; G09G 2360/16; G09G 2320/0646; G02F 1/133603
See application file for complete search history.

(56) References Cited

FOREIGN PATENT DOCUMENTS

| | | | |
|---|---|---|---|
| CN | 105741765 | A | 7/2016 |
| CN | 106023905 | A | 10/2016 |
| JP | 2017182091 | A | 10/2017 |

* cited by examiner display image by a local dimming technology      brightness of backlight blocks

IMAGE DISPLAY PROCESSING METHOD AND DEVICE, DISPLAY DEVICE AND NON-VOLATILE STORAGE MEDIUM

The present application claims priority of the Chinese Patent Application No. 201810481562.0, filed on May 18, 2018, the disclosure of which is incorporated herein by reference in its entirety as part of the present application.

TECHNICAL FIELD

Embodiments of the present disclosure relate to an image display processing method for a display device, an image display processing device, a display device and a non-volatile storage medium.

BACKGROUND

With a continuous progress of electronic technology, Virtual Reality (VR) or Augmented Reality (AR) technology as a high and new technology, has been increasingly applied in daily life such as in games, entertainment and the like. Virtual reality technology is also known as immersive technology or artificial environment.

A virtual reality system simulates a virtual three-dimensional world mainly through a high-performance computing system including a central processing unit, and provides users with sensory experience, such as vision, hearing and the like, through a head-mounted device, so as to enable the users to feel like being present, and moreover, human-computer interaction can also be available.

SUMMARY

At least one embodiment of the present disclosure provides an image display processing method for a display device, the display device includes a backlight unit, the backlight unit includes a plurality of display backlight blocks and is configured to be driven by a local dimming mode, and the image display processing method includes: obtaining a peak driving threshold of an (s−1)-th frame of image based on respective backlight values of the plurality of backlight blocks of the (s−1)-th frame of image after a first local dimming process is performed on the (s−1)-th frame of image; acquiring respective initial backlight values of the plurality of backlight blocks of an s-th frame of image, and performing a peak driving process on the respective initial backlight values of the plurality of backlight blocks of the s-th frame of image based on the peak driving threshold of the (s−1)-th frame of image, so as to obtain respective adjusted backlight values of the plurality of backlight blocks of the s-th frame of image; and displaying the s-th frame of image by using the respective adjusted backlight values of the plurality of backlight blocks of the s-th frame of image, and s is an integer greater than 1.

For example, in the image display processing method provided by some embodiments of the present disclosure, obtaining the peak driving threshold of the (s−1)-th frame of image based on the respective backlight values of the plurality of backlight blocks of the (s−1)-th frame of image after performing the first local dimming process on the (s−1)-th frame of image includes: acquiring a backlight power consumption margin of the (s−1)-th frame of image based on the respective backlight values of the plurality of backlight blocks of the (s−1)-th frame of image after performing the first local dimming process on the (s−1)-th frame of image; and acquiring the peak driving threshold of the (s−1)-th frame of image based on the backlight power consumption margin of the (s−1)-th frame of image.

For example, in the image display processing method provided by some embodiments of the present disclosure, acquiring the backlight power consumption margin of the (s−1)-th frame of image based on the respective backlight values of the plurality of backlight blocks of the (s−1)-th frame of image after performing the first local dimming process on the (s−1)-th frame of image includes: acquiring a total backlight power consumption of the (s−1)-th frame of image based on the respective backlight values of the plurality of backlight blocks of the (s−1)-th frame of image after performing the first local dimming process on the (s−1)-th frame of image.

For example, in the image display processing method provided by some embodiments of the present disclosure, acquiring the backlight power consumption margin of the (s−1)-th frame of image based on the respective backlight values of the plurality of backlight blocks of the (s−1)-th frame of image after performing the first local dimming process on the (s−1)-th frame of image further includes: acquiring the backlight power consumption margin of the (s−1)-th frame of image based on the total backlight power consumption of the (s−1)-th frame of image and a conventional backlight power consumption.

For example, the image display processing method provided by some embodiments of the present disclosure further includes: acquiring a maximum backlight value of the plurality of backlight blocks of the (s−1)-th frame of image, and judging whether the maximum backlight value of the plurality of backlight blocks of the (s−1)-th frame of image is greater than or equal to a preset threshold; judging whether a total backlight power consumption of the (s−1)-th frame of image is less than a conventional backlight power consumption; and in a case where the maximum backlight value of the respective backlight blocks of the (s−1)-th frame of image is great than or equal to the preset threshold and the total backlight power consumption of the (s−1)-th frame of image is less than the conventional backlight power consumption, obtaining the peak driving threshold of the (s−1)-th frame of image based on the backlight values of the respective backlight blocks of the (s−1)-th frame of image after performing the first local dimming process on the (s−1)-th frame of image is performed, and otherwise, the peak driving process on the respective initial backlight values of the plurality of backlight blocks of the s-th frame of image is not performed.

For example, in the image display processing method provided by some embodiments of the present disclosure, acquiring the peak driving threshold of the (s−1)-th frame of image based on the backlight power consumption margin of the (s−1)-th frame of image includes: arranging the respective backlight values of the plurality of backlight blocks of the (s−1)-th frame of image in an ascending order to obtain a first sequence, and acquiring the peak driving threshold of the (s−1)-th frame of image according to a following formula:

$$\sum_{x=G}^{bl\_max} (K-1)L(x) \times N(x) \le M(s), \text{ and}$$

$$\sum_{x=G-1}^{bl\_max} (K-1)L(x) \times N(x) > M(s),$$

where K represents a peak driving adjustment coefficient, G represents a serial number of each of the respective backlight values in the first sequence, M(s) represents the backlight power consumption margin of the (s−1)-th frame of image, L(x) represents a backlight value with a serial number x in the respective backlight values of the plurality of backlight blocks of the (s−1)-th frame of image, N(x) represents a number of backlight blocks of which the backlight value is L(x) in the plurality of backlight blocks of the (s−1)-th frame of image, and bl_max represents a serial number of a maximum backlight value of the plurality of backlight blocks of the (s−1)-th frame of image in the first sequence.

For example, in the image display processing method provided by some embodiments of the present disclosure, the backlight power consumption margin of the (s−1)-th frame of image is expressed as:

$$M(s)=PW(SD)-PW_{s-1}(LD),$$

where $PW_{s-1}(LD)$ represents a total backlight power consumption of the (s−1)-th frame of image, and PW(SD) represents a conventional backlight power consumption of the backlight unit.

For example, in the image display processing method provided by some embodiments of the present disclosure, the total backlight power consumption of the (s−1)-th frame of image is expressed as:

$$PW_{s-1}(LD) = \sum_{i=1}^{I} \sum_{j=1}^{J} B_{s-1}(i, j),$$

where $B_{s-1}(i, j)$ represents a backlight value of an (i, j)-th backlight block of the (s−1)-th frame of image, $1 \le i \le I$, $1 \le j \le J$, and I and J respectively represent a number of rows and a number of columns of an array in which the plurality of backlight blocks are arranged and are both integers greater than 1.

For example, in the image display processing method provided by some embodiments of the present disclosure, $B_{s-1}(i, j)$ is obtained according to grayscales of a plurality of pixels corresponding to the (i, j)-th backlight block of the (s−1)-th frame of image.

For example, in the image display processing method provided by some embodiments of the present disclosure, the conventional backlight power consumption is expressed as:

$$PW(SD)=Hm*I*J,$$

where Hm represents a maximum conventional backlight value.

For example, in the image display processing method provided by some embodiments of the present disclosure, acquiring the respective initial backlight values of the plurality of backlight blocks of the s-th frame of image, and performing the peak driving process on the respective initial backlight values of the plurality of backlight blocks of the s-th frame of image based on the peak driving threshold of the (s−1)-th frame of image, so as to obtain the adjusted backlight values of the respective backlight blocks of the s-th frame of image, includes: acquiring the respective initial backlight values of the plurality of backlight blocks of the s-th frame of image a second local dimming process is performed on the s-th frame of the image; judging whether an initial backlight value of an (n, p)-th backlight block of the s-th frame of image is greater than or equal to the peak driving threshold of the (s−1)-th frame of image; in a case where the initial backlight value of the (n, p)-th backlight block is greater than or equal to the peak drive threshold of the (s−1)-th frame of image, performing the peak driving process on the (n, p)-th backlight block to obtain the adjusted backlight value of the (n, p)-th backlight block; in a case where the backlight value of the (n, p)-th backlight block is less than the peak driving threshold of the (s−1)-th frame of image, keeping the initial backlight value of the (n, p)-th backlight block unchanged, and $1 \le n \le I$, $1 \le p \le J$, I and j respectively represent a number of rows and a number of columns of an array in which the plurality of backlight blocks are arranged.

For example, in the image display processing method provided by some embodiments of the present disclosure, performing the peak driving process on the (n, p)-th backlight block to obtain the adjusted backlight value of the (n, p)-th backlight block is performed according to a following formula:

$$B_s\_set(n,p)=K*B_s\_current(n,p),$$

where $B_s\_set(n, p)$ represents the adjusted backlight value after the peak driving processing is performed on the (n, p)-th backlight block of the s-th frame of image, $B_s\_current(n, p)$ represents the initial backlight value before performing the peak driving process on the (n, p)-th backlight block of the s-th frame of image, and k is a peak driving adjustment coefficient.

For example, the image display processing method provided by some embodiments of the present disclosure further includes: acquiring a maximum backlight value of the plurality of backlight blocks of the (s−1)-th frame of image; judging whether the maximum backlight value of the plurality of backlight blocks of the (s−1)-th frame of image is greater than or equal to a preset threshold; judging whether a total backlight power consumption of the (s−1)-th frame of image is less than a conventional backlight power consumption; and in a case where the maximum backlight values of the respective backlight blocks of the (s−1)-th frame of image is great than or equal to the preset threshold and the total backlight power consumption of the (s−1)-th frame of image is less than the conventional backlight power consumption, obtaining the peak driving threshold of the (s−1)-th frame of image based on the backlight values of the respective backlight blocks of the (s−1)-th frame of image after performing the first local dimming process on the (s−1)-th frame of image is performed, and otherwise, the peak driving process on the respective initial backlight values of the plurality of backlight blocks of the s-th frame of image is not performed.

At least one embodiment of the present disclosure also provides an image display processing device, which includes a peak driving threshold acquisition circuit, an adjusting backlight value acquisition circuit and an image display circuit. The peak driving threshold acquisition circuit is configured to obtain a peak driving threshold of an (s−1)-th frame of image based on respective backlight values of a plurality of backlight blocks of the (s−1)-th frame of image after performing a local dimming process on the (s−1)-th frame of image; the adjusting backlight value acquisition circuit is configured to acquire respective initial backlight values of the plurality of backlight blocks of an s-th frame of image, and perform a peak driving process on the respective initial backlight values of the plurality of backlight blocks of the s-th frame of image based on the peak driving threshold of the (s−1)-th frame of image, so as to obtain respective adjusted backlight values of the plurality of backlight blocks of the s-th frame of image; and the image display circuit, configured to display the s-th frame of image by using the respective adjusted backlight values of the respective backlight blocks of the s-th frame of image, and s is an integer greater than 1.

At least one embodiment of the present disclosure also provides an image display processing device, which includes a processor; a storage; and one or a plurality of computer program modules. The one or the plurality of computer program modules are stored in the storage and are configured to be executed by the processor, and the one or the plurality of computer program modules include an instruction used for achieving the image display processing method provided by any one of the embodiments of the present disclosure.

At least one embodiment of the present disclosure also provides a display device, which includes the image display processing device provided by any one of the embodiments of the present disclosure.

At least one embodiment of the present disclosure also provides a non-volatile storage medium, which stores a computer-readable instruction non-transitorily, and the image display processing method provided by any one of the embodiments of the present disclosure is executed in a case where the computer-readable instruction stored non-transitorily is executed by a computer.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1A:
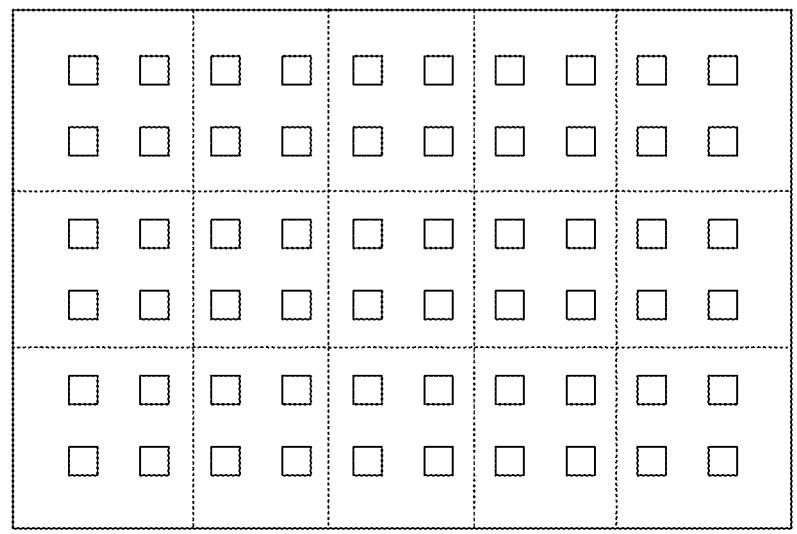
FIG. 1A is a schematic diagram of a backlight unit.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

A liquid crystal display (LCD) includes a liquid crystal panel and a backlight unit. Generally, a liquid crystal panel includes an array substrate and an opposite substrate (for example, a color filter substrate) disposed opposite to each other to form a liquid crystal cell, and a liquid crystal layer is filled between the array substrate and the opposite substrate in the liquid crystal cell. A first polarizer is on the array substrate, and a second polarizer is on the opposite substrate, and a polarization direction of the first polarizer is perpendicular to a polarization direction of the second polarizer, for example. The backlight unit is on a non-display side of the liquid crystal panel for providing a planar light source for the liquid crystal panel. Liquid crystal molecules of the liquid crystal layer are twisted by a driving electric field formed between a pixel electrode on the array substrate and a common electrode on the array substrate or a common electrode on the opposite substrate, so as to control a polarization direction of light passing through the liquid crystal molecules, and transmittance of the light is controlled by the cooperation of the first polarizer and the second polarizer, thereby realizing grayscale display. The backlight unit may be a direct-lit backlight unit or a side-lit backlight unit. A direct-lit backlight unit includes a plurality of point light sources (for example, LEDs) arranged side by side and a diffusion plate. Light emitted by the point light sources is homogenized by the diffusion plate, and then incident on the liquid crystal panel for display.

Local dimming technologies are generally only applicable to the direct-lit backlight unit, and a plurality of LEDs as the light sources are evenly distributed over an entire backplane, for example. For example, in an exemplary direct-lit backlight unit, a schematic diagram of dividing regions of the LED light sources in the entire backplane is shown in FIG. 1A. A small square as shown in FIG. 1A represents an LED unit, and a plurality of regions separated by broken lines represent a plurality of backlight regions (i.e., backlight blocks). Each of the plurality of backlight regions includes one or more LED units and can be controlled independently of other backlight regions. For example, the LEDs in each of the plurality of backlight block are linked, for example, connected in series, that is, currents passing through the LEDs in a same backlight block are consistent.

The local dimming technologies can adjust the brightness of the corresponding backlight block as shown in FIG. 1A according to the grayscales of screen content (i.e., image) to be displayed by the liquid crystal display panel. For example, for a portion with a higher brightness (grayscale) of the screen in display, the brightness of the backlight block corresponding to the portion is also high, and for a portion with a lower brightness of the screen in display, the brightness of the backlight block corresponding to the portion is also low, so backlight power consumption can be reduced, a contrast of the display screen can be improved, and a display quality can be enhanced.

Figure 1B:
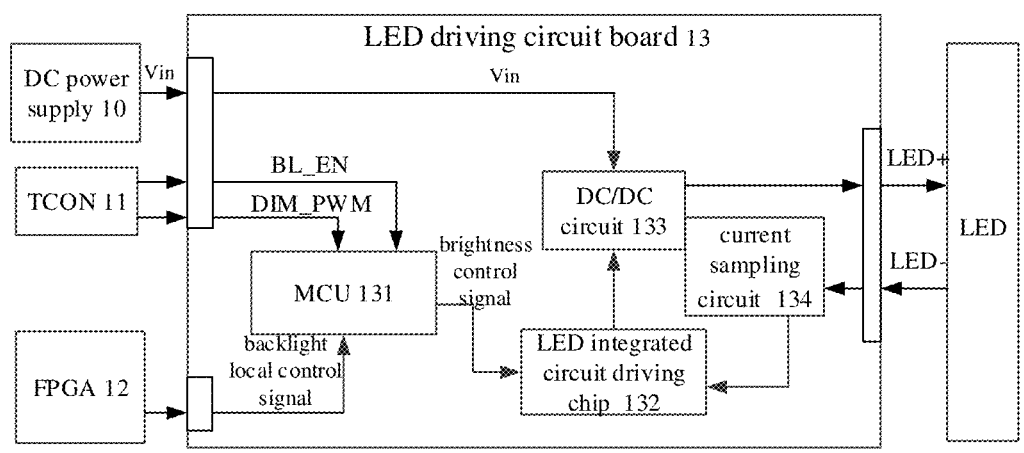
FIG. 1B is a schematic diagram of an exemplary system for performing a local dimming process on the backlight unit as shown in FIG. 1A.

FIG. 1B is a schematic diagram of an exemplary system for performing local dimming process on the backlight unit as shown in FIG. 1A. For example, in some examples, the system is implemented by hardware circuitry. As shown in FIG. 1B, the system includes, for example, a DC power supply 10, a TCON (Timer Control Register) 11, an FPGA (Field-Programmable Gate Array) 12, and an LED driving circuit board 13 for driving the LEDs to emit light. As shown in FIG. 1B, the LED driving circuit board 13 includes a micro-chip unit (MCU) 131, an LED integrated circuit driving chip 132, a DC/DC circuit 133, and a current sampling circuit 134. The LED driving circuit board 13 is configured to process each frame image signal to obtain processed backlight brightness data of each of the plurality of backlight blocks, and generate driving voltages used for various backlight regions based on the backlight brightness data. The driving voltages are output to the corresponding backlight blocks to drive the LEDs in the backlight blocks to emit light.

The MCU 131 receives a backlight local control signal (Local Dimming SPI (Serial Peripheral Interface) signal) from the FPGA 12, a SOC (System on Chip, not as shown in FIG. 1B), or the TCON 11, and the backlight local control signal is used in an "AND" operation (controlling whether the "AND" operation is performed according to an enable signal (BL_EN)) with a brightness modulation signal (DIM_PWM) from the TCON 11 to obtain a brightness control signal of each of the plurality of backlight blocks. Then, the MCU 131 outputs the brightness control signal to the LED integrated circuit driving chip 132 to implement current control of the LEDs of each of the plurality of backlight blocks, thereby controlling the luminance of each of the plurality of backlight blocks.

For example, the system for performing the local dimming processing is powered by an external DC power source 10, and the supply voltage Vin of the power source 10 is typically 24 voltages (V). For example, the DC/DC circuit 133 can employ a voltage conversion circuit (e.g., a Boost circuit) to boost the supply voltage Vin to a driving voltage required by illuminating the LEDs of each of the plurality of backlight blocks, and inputs the driving voltage to each backlight block under the control of the brightness control signal output by the LED integrated circuit driving chip to drive each of the plurality of backlight blocks to emit light.

Because even a small fluctuation of a working voltage applied to the LEDs may cause a large change of the current flowing though the LEDs, the LEDs in the system can be dimmed by a constant-current control mode. To achieve the constant-current control, cathode electrodes (LED−) of the plurality of LEDs connected in series in each of the plurality of backlight blocks is connected to the current sampling circuit 134 to monitor the stability of the currents flowing though LEDs in real time. The current sampling circuit 134 converts the currents flowing through the LEDs into voltage signals and feeds the voltage signals back to the LED integrated circuit driving chip 132, and then the LED integrated circuit driving chip 132 feeds the voltage signals back to the DC/DC circuit 133. After receiving the voltage signals, the DC/DC circuit 133 adjusts an output voltage input to anode electrodes (LED+) of the LEDs to achieve a steady current action on the LEDs. For example, the converted voltage signals are sampled and the sampled voltage signals are compared to a preset reference voltage. In a case where the sampled voltage signals is higher than the reference voltage, the current sampling circuit 134 outputs a control signal to enable the DC/DC circuit 133 to reduce the output voltage, thereby reducing the currents flowing through the LEDs; otherwise, the current sampling circuit 134 outputs another control signal to enable the DC/DC circuit 133 to boost the output voltage to increase the currents flowing through the LEDs. That is, the current sampling circuit 134 can be used as a negative feedback circuit to realize the constant-current control to the LEDs to enable the LEDs to work stably.

Figure 1C:
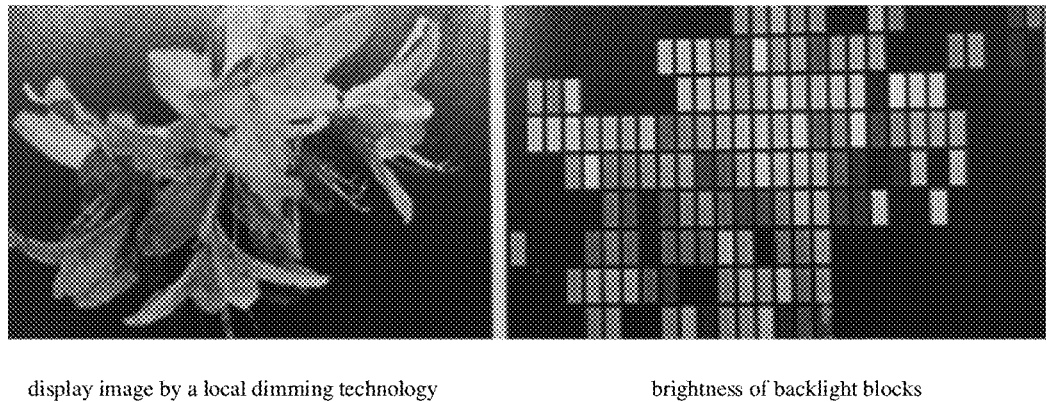
FIG. 1C is a schematic diagram of a display screen after a local dimming process is performed on the backlight unit and a display brightness of corresponding backlight blocks provided by an embodiment of the present disclosure.

FIG. 1C shows a schematic diagram of the display screen after the local dimming process is performed on the backlight unit and the display brightness of the corresponding backlight blocks. As shown in FIG. 1C, the backlight unit includes a plurality of rectangular backlight blocks arranged in an array. The local dimming technologies can adjust the brightness of the corresponding backlight block according to the grayscales of screen content (i.e., image) to be displayed by the liquid crystal display panel. For example, for a portion with a higher brightness (grayscale) of the screen in display, the brightness of the backlight block corresponding to the portion is also high, and for a portion with a lower brightness of the screen in display, the brightness of the backlight block corresponding to the portion is also low, so backlight power consumption can be reduced, a contrast of the display screen can be improved, and a display quality can be enhanced.

In a direct-lit backlight source, light emitted from the LEDs has a certain diffusion angle, leading to light of the backlight blocks has leaked, which causes the light emitted from the LEDs of the backlight blocks that need to display with a high brightness to diffuse to backlight blocks with a relatively dark brightness therearound, so that the display brightness of the backlight blocks that need to display with a high brightness does not reach the display brightness actually required by the display screen, thereby affecting the grayscales of the liquid crystal display screen corresponding to the backlight blocks. Therefore, the peak driving technologies can be used on the basis of the local dimming technologies to achieve to promote the display brightness of the backlight blocks that need to display with a high brightness. For example, the display brightness of the backlight blocks can be promoted to be higher than the required display brightness, so as to compensate for the decrease of the display brightness caused by the light leakage problem, and to avoid adverse effects caused by the light leakage problem. For example, the peak driving technologies can increase the currents of the LEDs of the corresponding backlight blocks by increasing backlight values of the backlight blocks to achieve the adjustment of the display brightness thereof.

Some peak driving technologies can only be performed after obtaining the backlight values of all backlight blocks, and all pixel values of a picture to be displayed need to be stored to obtain grayscales of the corresponding display contents, which requires larger hardware storage resources and longer program operation time, thus prolonging a data writing speed of CPU or GPU and the like, affecting a synchronization of a backlight data and a peak driving data, and affecting an improvement of the image quality of the display panel.

At least one embodiment of the present disclosure provides an image display processing method for a display device, the display device includes a backlight unit, the backlight unit includes a plurality of backlight blocks and is driven by a local dimming mode, and the image display processing method includes: obtaining a peak driving threshold of an (s−1)-th (s is an integer greater than 1) frame of image based on respective backlight values of the plurality of backlight blocks of the (s−1)-th frame of image after a first local dimming process is performed on the (s−1)-th frame of image; acquiring respective initial backlight values of the plurality of backlight blocks of an s-th frame of image, and performing a peak driving process on the respective initial backlight values of the plurality of backlight blocks of the s-th frame of image based on the peak driving threshold of the (s−1)-th frame of image, so as to obtain respective adjusted backlight values of the plurality of backlight blocks of the s-th frame of image; and displaying the s-th frame of image by using the respective adjusted backlight values of the plurality of backlight blocks of the s-th frame of image.

At least one embodiment of the present disclosure also provides an image display processing device, a display device and a storage medium corresponding to the image display processing method.

According to the image display processing method provided by at least one embodiment of the present disclosure, on one hand, backlight power consumption of a backlight source can be reduced, the backlight data and the peak driving data can be synchronously transmitted, real-time peak driving process on a display screen is realized, a contrast of the display image is improved, and users are provided with better visual experience; on the other hand, the image display processing method can also save hardware resources and a running time of program, and reduce a number of registers occupied by the image display processing method, thereby increasing the running speed of the display panel and further improving the display quality of the display panel.

Embodiments and some examples of the present disclosure are described in detail below with reference to the accompanying drawings. It should be noted that same or similar reference numerals in different drawings are used to refer to same elements that have been described.

Figure 2:
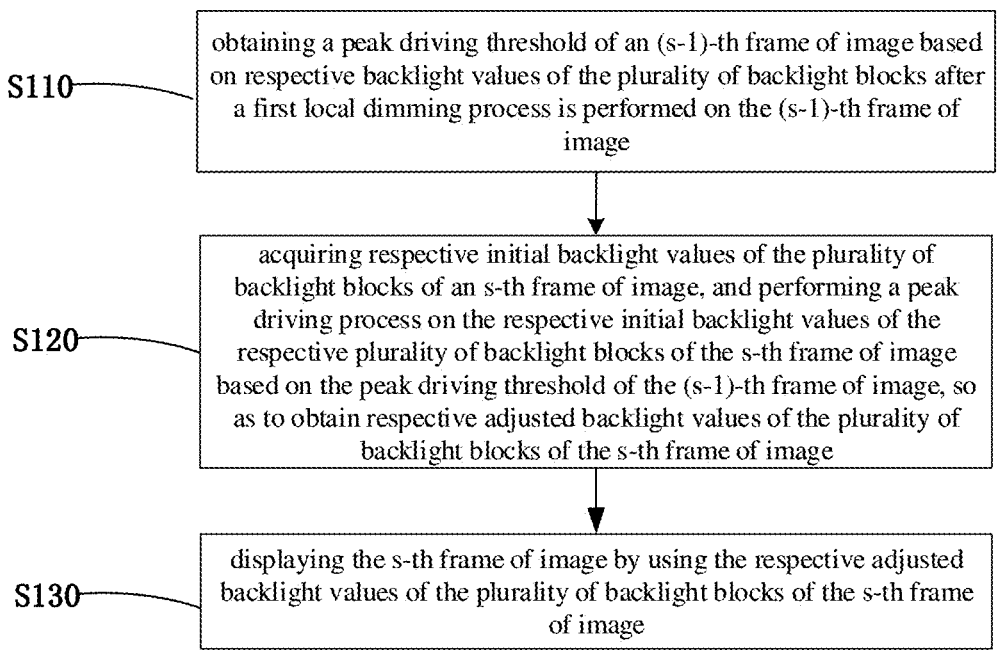
FIG. 2 is an exemplary flowchart of an image display processing method provided by an embodiment of the present disclosure.

FIG. 2 is an exemplary flowchart of an image display processing method for a display device provided by an embodiment of the present disclosure. For example, the display device includes a backlight unit, and the backlight unit includes a plurality of display backlight blocks and is driven by a local dimming mode. For example, the display backlight blocks of the backlight unit may be set in a manner as shown in FIG. 1A or FIG. 1C, or may be set in other manners, and the embodiments of the present disclosure are not limited to these cases. For example, the display device is an LCD display device or an electronic paper display device, etc., and the LCD display device may be described below as an example. For example, at least a part of the image display processing method can be implemented in software, and loaded and executed by a processor in a display panel, or at least a part of the image display processing method can be implemented in hardware or firmware, to solve the problems, such as long operation time, data transmission delay and the like, in the display process.

For example, the LCD display device may further include a pixel array, a data decoding circuit, a timing controller (T-con), a gate driving circuit, a data driving circuit, a storage device (for example, a flash memory or the like) and the like. The data decoding circuit receives a display input signal and decodes the display input signal to obtain a display data signal; and the timing controller outputs timing signals to control the gate driving circuit, the data driving circuit, etc., to enable the circuits to work synchronously, and can perform gamma correction on the display data signal. The processed display data signal is input to the data driving circuit to perform a display operation. These components can be used in a conventional manner and are not described here again.

Next, an image display processing method for a display device according to an embodiment of the present disclosure is described with reference to FIG. 2. As shown in FIG. 2, the image display processing method includes steps S110 to S130. According to respective backlight values of a plurality of backlight blocks of the backlight unit of a previous frame of image (an (s−1)-th frame of image), it is determined whether a peak driving process is performed on each of the plurality of backlight blocks of the backlight unit of a current frame of image (an s-th frame of image) after a local dimming process is performed on the current frame of image. The steps S110 to S130 of the image display processing method and respective exemplary implementations of the Steps S110 to S130 are respectively described below.

Step S110: obtaining a peak driving threshold of an (s−1)-th (s is an integer greater than 1) frame of image based on respective backlight values of the plurality of backlight blocks of the (s−1)-th frame of image, after a first local dimming process on the (s−1)-th frame of image.

Step S120: acquiring respective initial backlight values of the plurality of backlight blocks of an s-th frame of image, and performing a peak driving process on the respective initial backlight values of the plurality of backlight blocks of the s-th frame of image based on the peak driving threshold of the (s−1)-th frame of image, so as to obtain respective adjusted backlight values of the plurality of backlight blocks of the s-th frame of image.

Step S130: displaying the s-th frame of image by using the respective adjusted backlight values of the plurality of backlight blocks of the s-th frame of image.

For example, in the above method, the peak driving threshold of the (s−1)-th frame of image is taken as the peak driving threshold of the s-th frame of image for performing the peak driving process on the s-th frame of image by using the peak driving threshold.

In some examples, obtaining the peak driving threshold of the (s−1)-th frame of image based on the respective backlight values of the plurality of backlight blocks of the (s−1)-th frame of image after the first local dimming process is performed on the (s−1)-th frame of image, includes: acquiring a backlight power consumption margin of the (s−1)-th frame of image based on the respective backlight values of the plurality of backlight blocks of the (s−1)-th frame of image after the first local dimming process is performed on the (s−1)-th frame of image; and then acquiring the peak driving threshold of the (s−1)-th frame of image based on the backlight power consumption margin of the (s−1)-th frame of image.

In the embodiment of the present disclosure, the "backlight power consumption margin" refers to a scope for further increasing the backlight power consumption of the backlight unit through performing the peak driving process on the backlight unit after the local dimming process is performed on the backlight unit. Determining the peak driving threshold of the current frame of image through the backlight power consumption margin can ensure that the contrast of the image is further improved under the condition that the backlight power consumption of the current frame of image is less than a conventional backlight power consumption.

In some examples, for example, acquiring the peak driving threshold of the (s−1)-th frame of image based on the backlight power consumption margin of the (s−1)-th frame of image includes: arranging the respective backlight values of the plurality of backlight blocks of the (s−1)-th frame of image in an ascending order to obtain a first sequence, and acquiring the peak driving threshold of the (s−1)-th frame of image according to a following formula:

$$\sum_{x=G}^{bl\_max} (K-1)L(x) \times N(x) \le M(s), \text{ and} \quad (1)$$

$$\sum_{x=G-1}^{bl\_max} (K-1)L(x) \times N(x) > M(s), \quad (2)$$

where G represents a serial number of each of the respective backlight values in the first sequence, M(s) represents the backlight power consumption margin of the (s−1)-th frame of image, L(x) represents a backlight value with a serial number x in the respective backlight values of the plurality of backlight blocks of the (s−1)-th frame of image which is after the first local dimming process (before a peak driving process), N(x) represents a number of backlight blocks of which the backlight value is L(x), in the plurality of backlight blocks of the (s−1)-th frame of image, and bl_max represents a serial number of a maximum backlight value of the plurality of backlight blocks of the (s−1)-th frame of image in the first sequence; K represents a peak driving adjustment coefficient, and is $(2^a-1)/(2^b-1)$ for example, where a is a byte number occupied by a maximum backlight value of the backlight blocks and is usually a hardware parameter, b is a byte number occupied by a maximum backlight value L(x), a is greater than b and the extra byte is for the peak driving process. For example, for each backlight unit, a and b both may be set to be constant. Thus, for each frame of image, the value of K is same; for each backlight block needs to be performed with a peak driving process in each frame of image, the value of K is same.

For example, the backlight values L(x) of the plurality of backlight blocks of the (s−1)-th frame of image are stored in the first sequence accordingly. For example, the first sequence may be in a form of an array, and contents stored in a corresponding serial number (i.e., address) in the array are invoked through a corresponding program statement. For example, the program statement may be stored and executed by a control device (e.g., FPGA) to realize corresponding functions. For example, a range of the serial number G can be set to be between a serial number where a preset threshold is located and bl_max, and in this situation, only backlight values greater than or equal to the preset threshold to the maximum backlight value in the first sequence are involved.

For example, $$\sum_{x=G}^{bl\_max} (K_{s-1}-1)L(x) \times N(x)$$

represents the peak driving power consumption margin. Formula (1) and Formula (2) indicate that: when a peak driving power consumption margin PW(pd) corresponding to h (h is an integer greater than 0) backlight values stored in the serial number G to the serial number bl_max is less than or equal to the backlight power consumption margin of the (s−1)-th frame of image, and a peak driving power consumption margin PW(pd) corresponding to the h+1 backlight values stored in the serial number G−1 to the serial number bl_max is greater than the backlight power consumption margin of the (s−1)-th frame of image, the peak driving threshold of the (s−1)-th frame of image is set to be the backlight value stored in the serial number G in the first sequence of the (s−1)-th frame of image.

In some examples, acquiring the backlight power consumption margin of the (s−1)-th frame of image based on the respective backlight values of the plurality of backlight blocks of the (s−1)-th frame of image after the first local dimming process is performed on the (s−1)-th frame of image includes: acquiring a total backlight power consumption of the (s−1)-th frame of image based on the respective backlight values of the plurality of backlight blocks of the (s−1)-th frame of image after the first local dimming process is performed on the (s−1)-th frame of image.

In other some examples, acquiring the backlight power consumption margin of the (s−1)-th frame of image based on the respective backlight values of the plurality of backlight blocks of the (s−1)-th frame of image after the first local dimming process is performed on the (s−1)-th frame of image may further includes: acquiring the backlight power consumption margin of the (s−1)-th frame of image based on the total backlight power consumption of the (s−1)-th frame of image and a conventional backlight power consumption.

For example, the backlight power consumption margin of the (s−1)-th frame of image can be expressed as:

$$M(s)=PW(SD)-PW_{s-1}(LD) \quad (3)$$

where $PW_{s-1}(LD)$ represents the total backlight power consumption of the (s−1)-th frame of image, and PW(SD) represents the conventional backlight power consumption of the backlight unit.

For example, the total backlight power consumption of the (s−1)-th frame of image can be expressed as:

$$PW_{s-1}(LD) = \sum_{i=1}^{I} \sum_{j=1}^{J} B_{s-1}(i, j), \quad (4)$$

where $B_{s-1}(i, j)$ represents a backlight value of an (i, j)-th backlight block of the (s−1)-th frame of image, 1≤i≤I, 1≤j≤J, I and j respectively represent a number of rows and a number of columns of an array in which the plurality of backlight blocks are arranged, and I and j are integers greater than 1.

For example, the conventional backlight power consumption can be expressed as:

$$PW(SD)=Hm*I*J \quad (5)$$

where PW(SD) represents a conventional backlight power consumption, which is exemplarily a maximum consumption of a conventional backlight unit without a local dimming function; Hm represents a maximum conventional backlight value, i.e. a maximum backlight value of a backlight block of the conventional backlight unit, which is usually a hardware parameter; for example, a number of bytes occupied by the maximum conventional backlight value is w, and Hm is $2^w-1$. For example, in a case where the number of bytes occupied by the maximum conventional backlight value is 8, Hm is 255. For example, in a case where the maximum conventional backlight value is expressed in 10 bytes, the above parameter Hm can be changed from 255 to 1023 accordingly. It should be noted that the value of the conventional backlight power consumption can also be set according to a resolution of the display panel and a number of the plurality of backlight blocks, which is not limited to the embodiments of the present disclosure. For example, a>b=w. Here the conventional backlight power consumption is referred to and it is ensured that no backlight power consumption is increased with performing a peak driving process, compared with a conventional backlight unit.

Figure 3:
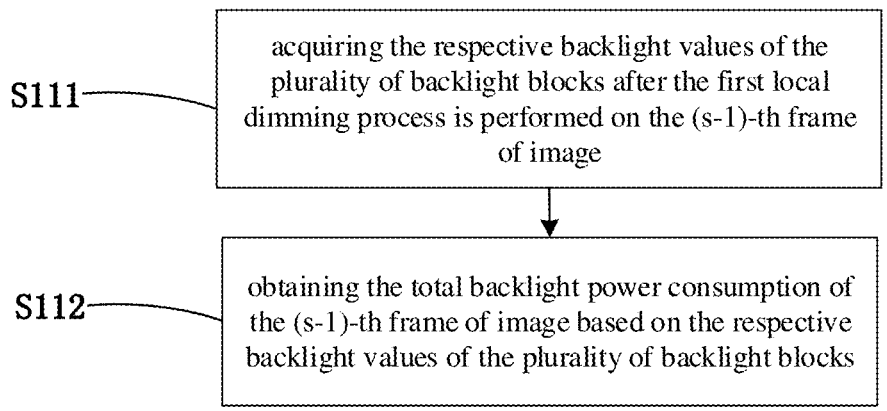
FIG. 3 is a flowchart of obtaining a total backlight power consumption in an image display processing method provided by an embodiment of the present disclosure.

FIG. 3 is a flowchart of obtaining the total backlight power consumption in an image display processing method provided by an embodiment of the present disclosure. For example, as shown in FIG. 3, the method of obtaining the total backlight power consumption in the image display processing method includes steps S111 to S112.

Step S111: acquiring the respective backlight values of the plurality of backlight blocks of the (s−1)-th frame of image after the first local dimming process is performed on the (s−1)-th frame of image.

For example, the backlight value of each backlight block is related to the grayscales of all pixels corresponding to the each backlight block. For example, the backlight value $B_{s-1}(i, j)$ of the backlight block after the first local dimming process is performed on the (s−1)-th frame of image can be obtained by averaging the grayscales of all pixels of the (i, j)-th backlight block and then adjusting the obtained average value according to a number of bytes occupied by the backlight value and a number of bytes occupied by the grayscale (the two may be the same or different). Similarly, the backlight values of other backlight blocks (i.e., I*J−1 backlight blocks) of the (s−1)-th frame of image can be obtained by the same or similar method. For example, the grayscales of all pixels corresponding to each backlight block are grayscales of the display image obtained by performing a decoding process by the data decoding circuit and a gamma correction process on input signals of the (s−1)-th frame of image.

Step S112: obtaining the total backlight power consumption of the (s−1)-th frame of image based on the respective backlight values of the plurality of backlight blocks.

For example, the total backlight power consumption of the (s−1)-th frame of image can be obtained by equation (4). The backlight value $B_{s-1}(i, j)$ of the (i, j)-th backlight block of the (s−1)-th frame of image can be obtained by the step S111.

For example, after obtaining the respective backlight values of the plurality of backlight blocks of the (s−1)-th frame of image after the first local dimming process is performed on the (s−1)-th frame of image through the step S111, a maximum backlight value of the respective backlight blocks of the (s−1)-th frame of image can be obtained through a method of comparison one by one or other sorting methods.

For example, the peak driving threshold of the (s−1)-th frame of image can be acquired by the peak driving threshold acquisition circuit, and the peak driving threshold acquisition circuit can be realized by a central processing unit (CPU) or other forms of processing units having data processing capability and/or instruction execution capability. The processing units may be a general purpose processor or a dedicated processor, and may be a processor based on X86 or ARM architecture, or the like.

In the step S120 of the above method, for example, the initial backlight value $B_s(i, j)$ of the (i, j)-th backlight block after a second local dimming process is performed on the s-th frame of image can be obtained by averaging the grayscales of all pixels of the (i, i)-th backlight block of the (s−1)-th frame of image and adjusting the obtained average value according to a number of bytes occupied by the backlight value and a number of bytes occupied by the grayscale (the two may be the same or different). Similarly, the initial backlight values of other backlight blocks (i.e., I*J−1 backlight blocks) of the s-th frame of image can be obtained by the same or similar method. For example, the grayscales of all pixels corresponding to each backlight block are the grayscales of the display image obtained by performing a decoding process by the data decoding circuit and a gamma correction process on input signals of the s-th frame of image.

For example, the respective adjusted backlight values of the plurality of backlight blocks of the s-th frame of image can be acquired by an adjusting backlight value acquisition circuit, and the adjusting backlight value acquisition circuit can be realized by the above-mentioned central processing unit (CPU) or other forms of processing units with data processing capability and/or instruction execution capability.

Figure 4:
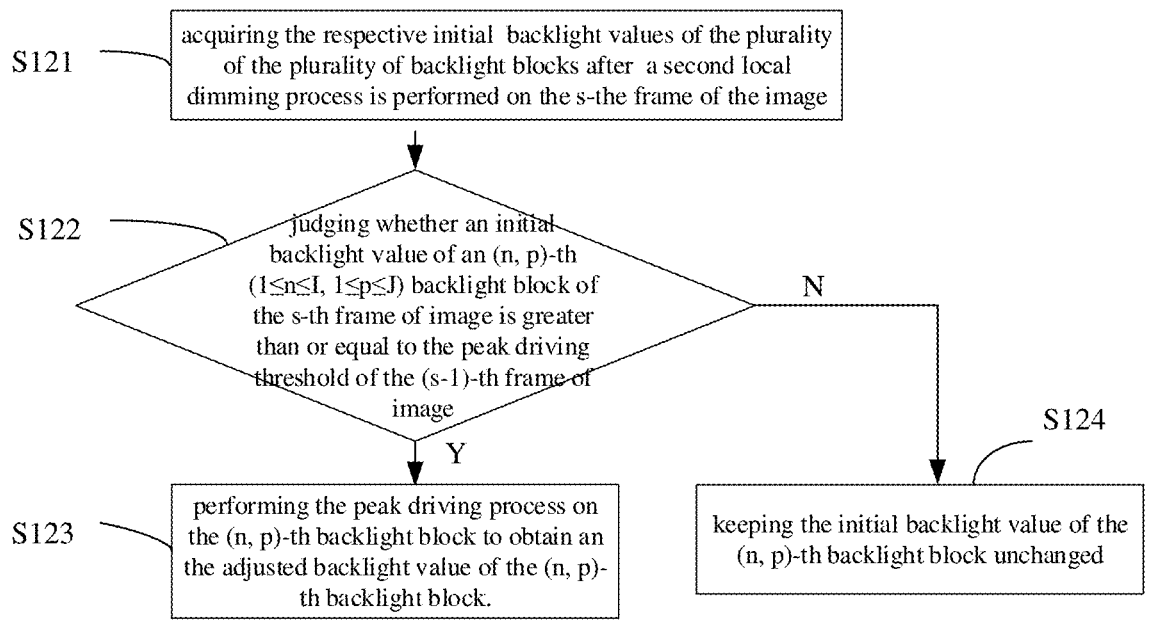
FIG. 4 is a flowchart of a peak driving process in an image display processing method provided by an embodiment of the present disclosure.

FIG. 4 is a flowchart of a peak driving process method in an image display processing method provided by an embodiment of the present disclosure. That is, FIG. 4 is an exemplary flowchart the step S120 as shown in FIG. 2. As shown in FIG. 4, the peak driving process method includes steps S121 to S124.

Step S121: acquiring the respective initial backlight values of the plurality of backlight blocks of the s-th frame of image after a second local dimming process is performed on the s-th frame of the image.

For example, the respective initial backlight values of the plurality of backlight blocks of the s-th frame of image may be acquired by the method described in the step S120.

Step S122: judging whether an initial backlight value of an (n, p)-th (1≤n≤I, 1≤p≤J) backlight block of the s-th frame of image is greater than or equal to the peak driving threshold of the (s−1)-th frame of image, if so, executing step S123; if not, executing step S124.

For example, the initial backlight value of the (n, p)-th backlight block of the s-th frame of image can be obtained through the step S121. For example, the peak driving threshold of the (s−1)-th frame of image can be obtained through the step S110. For example, in a case where the initial backlight value of the (n, p)-th backlight block is greater than or equal to the peak driving threshold of the (s−1)-th frame of image, the peak driving process is performed on the (n, p)-th backlight block to obtain the adjusted backlight value of the (n, p)-th backlight block. For example, in a case where the backlight value of the (n, p)-th backlight block is less than the peak driving threshold of the (s−1)-th frame of image, the initial backlight value of the (n, p)-th backlight block is kept unchanged; in other words, the adjusted backlight value of the backlight block is equal to the initial backlight value.

Step S123: performing the peak driving process on the (n, p)-th backlight block to obtain the adjusted backlight value of the (n, p)-th backlight block.

For example, performing the peak driving process on the (n, p)-th backlight block to obtain the adjusted backlight value of the (n, p)-th backlight block can be performed according to a following formula:

$$B_{s\_set}(n,p) = K * B_{s\_current}(n,p) \quad (6),$$

where $B_{s\_set}(n, p)$ represents the adjusted backlight value after the peak driving process is performed on the (n, p)-th backlight block of the s-th frame of image, $B_{s\_current}(n, p)$ represents the initial backlight value before performing the peak driving process on the (n, p)-th backlight block of the s-th frame of image, and K is the above peak driving adjustment coefficient.

For example, the peak driving adjustment coefficient K is greater than or equal to 1, and for example, the peak driving adjustment coefficient K may take a value of 1.1 to 2, etc. For example, for some backlight blocks, the adjusted backlight value $B_{s\_set}(n,p)$ may be greater than the above-mentioned maximum conventional backlight value Hm, so that a contrast ratio of the display image is effectively improved without increasing the consumption. It should be noted that the value of the peak driving adjustment coefficient K depends on the specific situation, which is not limited to the embodiment of the present disclosure. For example, the greater the degree to which the initial backlight value of the (n, p)-th backlight block is larger than the peak driving threshold, the greater the value of the peak driving adjustment coefficient K is. For example, the peak driving adjustment coefficient K is used to adjust light emission current of the LEDs of the corresponding backlight block.

For example, the initial backlight value $B_{s\_current}(n, p)$ before performing the peak driving process on the (n, p)-th backlight block of the s-th frame of image can be obtained by the step S121.

Step S124: keeping the initial backlight value of the (n, p)-th backlight block unchanged.

For example, the initial backlight value of the (n, p)-th backlight block is not adjusted, that is, the initial backlight value $B_{s\_current}(n, p)$ before performing the peak driving process on the (n, p)-th backlight block of the s-th frame of image is output to the corresponding backlight block for displaying the image. For example, in the step S124, the peak driving adjustment coefficient K is taken as 1.

In the step S130 of the above method, for example, the respective adjusted backlight values of a plurality of backlight blocks of the s-th frame of image can be acquired through the step S123 or the step S124. For example, the respective adjusted backlight values of the plurality of backlight blocks of the s-th frame of image are input to the local dimming driving system of the LEDs backlight source as shown in FIG. 1B to drive the corresponding backlight blocks of the backlight source to emit light, and display grayscales of the LCD are compensated by the backlight values after the peak driving process is performed on the s-th frame of image, thereby realizing synchronous transmission of the backlight data and the peak driving data. For example, liquid crystal molecules in sub-pixels of a liquid crystal panel located at front of the backlight source are correspondingly deflected according to display data signal input by the data driving circuit, so as to control the rotation degree of polarized light which emits from each backlight block of the LEDs backlight source and passes through a polarizing plate, thereby displaying corresponding grayscales on a display screen and realizing to display the s-th frame of image.

For example, the s-th frame of image may be displayed by an image display circuit, and the image display circuit may be realized by the above-mentioned central processing unit (CPU) or other forms of processing units having data processing capability and/or instruction execution capability.

According to the image display processing method provided by an embodiment of the present disclosure, on the one hand, peak driving process is only performed on the backlight block with the backlight value larger than the peak driving threshold, and other backlight blocks are not processed, so that the backlight power consumption of the display device is reduced, and at the same time, because the adjusted backlight value is input to the local dimming driving system to control the backlight source to emit light, the backlight data and the peak driving data can be synchronously transmitted, real-time peak driving display of a picture can be realized, the contrast of a displayed image is improved, and users are provided with better visual experience; on the other hand, because the image display processing method simultaneously uses the backlight data of the previous frame of image and the current frame of image to performing the peak driving process, and it is not necessary to cache all pixel values and all backlight data of the current frame of image, the hardware resources and the running time of program is saved, the number of the registers occupied by the image display processing method is reduced, thereby increasing the running speed of the display panel and further improving the display quality of the display panel.

Figure 5:
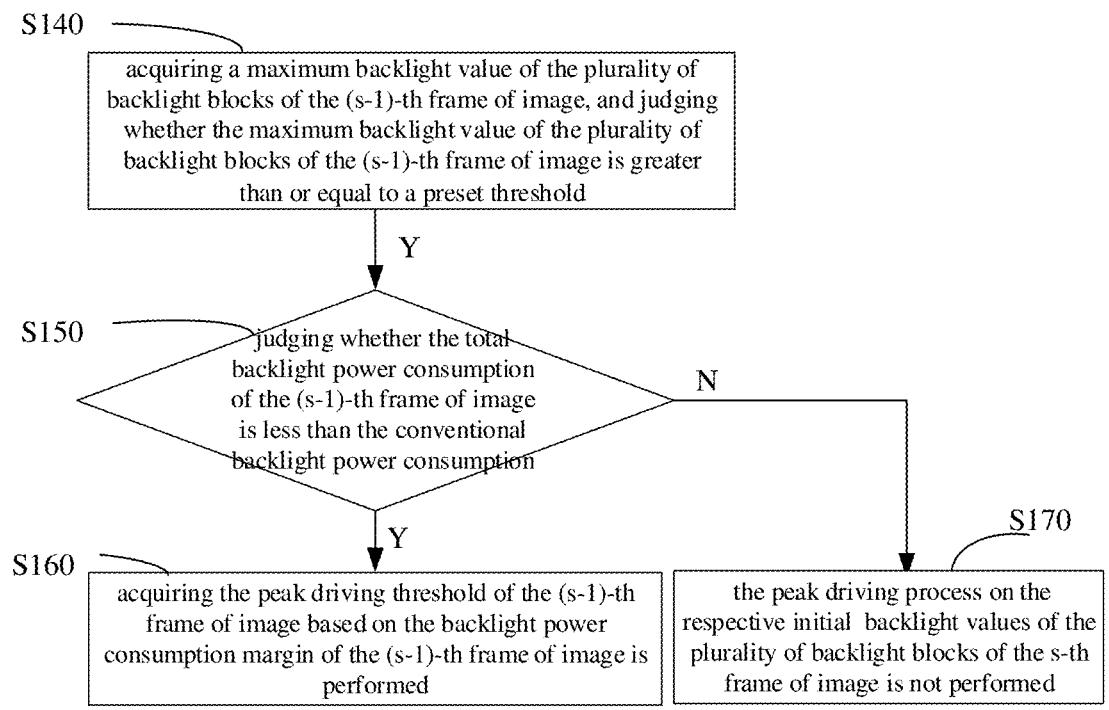
FIG. 5 is another exemplary flowchart of an image display processing method provided by an embodiment of the present disclosure.

FIG. 5 is a flowchart of another example of an image display processing method provided by an embodiment of the present disclosure. As shown in FIG. 5, the peak driving process method includes the steps S140 to S160.

Step S140: acquiring a maximum backlight value of the plurality of backlight blocks of the (s−1)-th frame of image, and judging whether the maximum backlight value of the plurality of backlight blocks of the (s−1)-th frame of image is greater than or equal to a preset threshold, if so, executing step S150.

For example, after acquiring the respective backlight values of the plurality of backlight blocks of the (s−1)-th frame of image after the first local dimming process is performed on the (s−1)-th frame of image through the step S111, the maximum backlight value of the plurality of backlight blocks of the (s−1)-th frame of image can be acquired through a method of comparison one by one or other sorting methods.

For example, the value of the preset threshold may be determined according to experience depending on the specific situation. For example, in a case where the grayscales are between 0-255 and the number of bytes occupied by the backlight values and the grayscales are both 8, the preset threshold may be 230 or 235, etc. The embodiment of the present disclosure is not limited in this aspect.

Step S150: judging whether the total backlight power consumption of the (s−1)-th frame of image is less than the conventional backlight power consumption, if so, executing step S160; if not, executing step S170.

For example, the total backlight power consumption of the (s−1)-th frame of image can be obtained by Equation (4), and the conventional backlight power consumption can be obtained by Equation (5).

For example, in a case where the maximum backlight value of the plurality of backlight blocks of the (s−1)-th frame of image is greater than or equal to the preset threshold and the total backlight power consumption of the (s−1)-th frame of image is less than the conventional backlight power consumption, the peak driving threshold of the (s−1)-th frame of image is acquired based on the backlight power consumption margin of the (s−1)-th frame of image, and then the steps S110-S130 as shown in FIG. 2 are executed. For example, in a case where the maximum backlight value of the plurality of backlight blocks of the (s−1)-th frame of image is less than the preset threshold or the total backlight power consumption of the (s−1)-th frame of image is greater than or equal to the conventional backlight power consumption, the peak driving process is not performed on the respective initial backlight values of the plurality of backlight blocks of the s-th frame of image, that is, the respective initial backlight values of the plurality of backlight blocks of the s-th frame of image is directly input to the system as shown in FIG. 1B to drive the corresponding LED for display.

Step S160: acquiring the peak driving threshold of the (s−1)-th frame of image based on the backlight power consumption margin of the (s−1)-th frame of image.

Step S160 is similar to the step S110 as shown in FIG. 2 and will not be repeated here.

Step S170: no performing the peak driving process on the respective initial backlight values of the plurality of backlight blocks of the s-th frame of image.

For example, various parameters such as the adjusted backlight value of the (n, p)-th backlight block of the s-th frame of image after the peak driving process is performed on the s-th frame of image, the peak driving threshold of the (s−1)-th frame of image, the backlight power consumption margin of the (s−1)-th frame of image, the preset threshold, and the respective backlight values of the plurality of backlight blocks of the (s−1)-th frame of image in the above operation steps can be stored in the memory of the display panel and invoked by the controller when necessary. It should be noted that cases are similar in the following examples and will not be described again.

It should be noted that, in respective embodiments of the present disclosure, the flow of the image display processing method may include more or less operations, and these operations can be performed sequentially or in parallel. Although the flow of the image display processing method described above includes a plurality of operations in a specific order, it should be clearly understood that the order of the plurality of operations is not limited in this aspect. The image processing method described above may be performed once or may be performed a plurality of times according to predetermined conditions. It should be noted that the following embodiments are the same the above embodiments and will not be described again.

Figure 6:
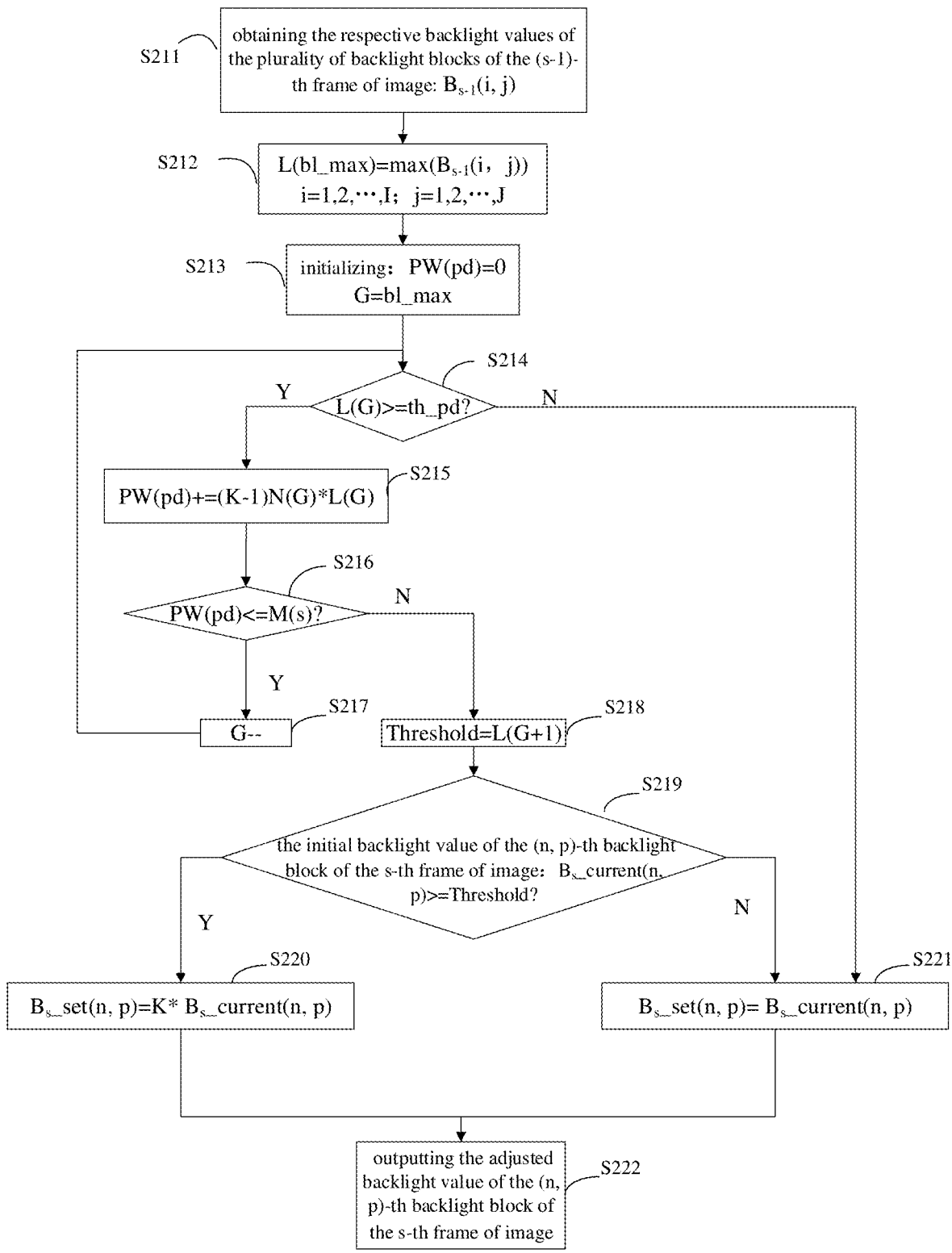
FIG. 6 is a system flowchart of an image display processing method provided by an embodiment of the present disclosure.

FIG. 6 is a system flowchart of an image display processing method provided by an embodiment of the present disclosure. As shown in FIG. 6, the system flowchart includes steps S211 to S222. For example, the steps S211 to S218 are processes of acquiring the peak driving threshold of the (s−1)-th frame of image, i.e., corresponding to the step S110 as shown in FIG. 2. For example, the steps S219 to S222 are processes of acquiring the respective adjusted backlight values of the plurality of backlight blocks of the s-th frame of image, i.e., corresponding to the step S120 as shown in FIG. 2.

Step S211: obtaining the respective backlight values of the plurality of backlight blocks of the (s−1)-th frame of image: $B_{s-1}(i, j)$.

For example, the backlight value $B_{s-1}(i, j)$ of the plurality of backlight blocks of the (s−1)-th frame of image represents the backlight value of the plurality of backlight blocks after the first local dimming process is performed on the (s−1)-th frame of image. For example, the specific implementation process of the step S211 may refer to the description of the step S111 as shown in FIG. 3 and will not be repeated here.

Step S212: $L(bl\_max) = \max(B_{s-1}(i, j))$, and $1 \leq i \leq I$, $1 \leq j \leq J$.

For example, step S212 represents that the maximum backlight value of the plurality of backlight blocks of the (s−1)-th frame of image is stored in the address of the serial number bl_max of the first sequence, that is, in a case where the serial number (address) bl_max is invoked by a controller, the read data is the maximum backlight value of the plurality of backlight blocks of the (s−1)-th frame of image, and is recorded as L(bl_max).

For example, the backlight value $B_{s-1}(i, j)$ of the (i, j)-th backlight block of the (s−1)-th frame of image in the formula can be obtained through the step S211. For example, after obtaining the respective backlight values of the plurality of backlight blocks of the (s−1)-th frame of image by the step S211, the maximum backlight value of the plurality of backlight blocks of the (s−1)-th frame of image can be obtained through a method of comparison one by one or other sorting methods.

Step S213: PW(pd)=0, G=bl_max.

For example, the peak driving power consumption margin PW(pd) and the serial number G are initialized in the step S213. For example, the initial value of the peak driving power consumption margin PW(pd) is 0, and the initial value of the serial number G is the serial number bl_max in the first sequence where the maximum backlight value of the plurality of backlight blocks of the (s−1)-th frame of image is located. Meanwhile, the content, which is the maximum backlight value L(bl_max) of the plurality of backlight blocks of the (s−1)-th frame of image, in the serial number bl_max, is assigned to L(G).

Step S214: judging whether the backlight value L(G) of the backlight block of the (s−1)-th frame of image stored in the serial number G is greater than or equal to the preset threshold th_pd, if so, executing step S215; If not, executing step S221.

For example, the above operations can be expressed as follows:

$$L(G) >= th\_pd,$$

where th_pd represents the preset threshold, for example, can be 230 or 235 as described above.

For example, when performing the step S214 for a first time, L(G) is the maximum backlight value L(bl_max) of the plurality of backlight blocks of the (s−1)-th frame of image. For example, in a case where the maximum backlight value L(bl_max) of the plurality of backlight blocks of the (s−1)-th frame of image is greater than or equal to the preset threshold th_pd, the peak driving power consumption margin PW(pd) is calculated. For example, in a case where the maximum backlight value L(bl_max) of the plurality of backlight blocks of the (s−1)-th frame of image is less than the preset threshold th_pd, the respective initial backlight values of the plurality of backlight blocks of the s-th frame of image are output as the respective adjusted backlight values after the peak driving process is performed on the s-th frame of image, that is, the peak driving process is not performed on the respective initial backlight values of the plurality of backlight blocks of the s-th frame of image.

Step S215: obtaining the peak driving power consumption margin PW(pd) according to the following statement:

$$PW(pd) += (K-1)N(G)*L(G).$$

For example, the above statement can be expressed as PW(pd)=PW(pd)+N(G)*L(G). For example, each time the step S214 is executed, the peak driving power consumption PW(pd) is increased by (K−1)N(G)*L(G) from an original value, so as to realize an accumulative function, i.e., realizing the function:

$$\sum_{x=G}^{bl\_max} (K-1)L(x) \times N(x).$$

Step S216: judging whether the peak driving power consumption margin PW(pd) acquired in the step S215 is less than or equal to the backlight power consumption margin M(s) of the (s−1)-th frame of image, and if so, executing step S217; If not, executing step S218.

For example, the above operations can be performed according to the following statement:

$$PW(pd) \leq M(s)?$$

For example, the backlight power consumption margin M(s) of the (s−1)-th frame of image can be obtained by equation (3) in the step S110.

For example, in a case where the peak driving power consumption margin PW(pd) is less than or equal to the backlight power consumption margin M(s) of the (s−1)-th frame of image, the value of the current serial number G is reduced by 1 and the steps S214 to S216 is continued. For example, in a case where the peak driving power consumption margin PW(pd) is greater than the backlight power consumption margin M(s) of the (s−1)-th frame of image, the backlight value of the backlight block stored in a serial number G+1 is output as the peak driving threshold of the (s−1)-th frame of image.

Step S217: reducing the value of the serial number G by 1, and jumping back to the step S214 and continuing to execute the step S214, until the judgment statement in the step S216 satisfies that the peak driving power consumption PW(pd) is greater than or equal to the backlight power consumption margin M(s) of the (s−1)-th frame of image, stopping the cycle, and executing step S218, that is, outputting the backlight value of the backlight block stored in the serial number G+1 as the peak driving threshold of the (s−1)-th frame of image.

For example, the above operations can be performed according to the following statement:

G−−.

For example, the statement is a circular statement which can be expressed as G=G−1. For example, each time the step S216 is executed, the serial number G is reduced by 1 from an original value (e.g., bl_max). For example, the range of G can be set to be between the serial number where the preset threshold is located and bl_max.

For example, the steps S214 and S217 may be executed cyclically according to the value of G until the peak driving power consumption margin PW(pd) is greater than or equal to the backlight power consumption margin M(s) of the (s−1)-th frame of image, thereby determining the peak driving threshold of the (s−1)-th frame of image.

Step S218: outputting the backlight value L (G+1) of the backlight block stored in the serial number G+1 as the peak driving threshold of the (s−1)-th frame of image.

For example, the above operations can be expressed as the following statement:

Threshold=$L(G+1)$, where L(G+1) represents an (G+1)-th backlight value stored in the first sequence.

For example, when the peak driving power consumption margin PW(pd) corresponding to u+1 (u is an integer greater than 1) backlight values stored from the serial number bl_max to the serial number G is greater than the backlight power consumption margin of the (s−1)-th frame of image, and the peak driving power consumption margin PW(pd) corresponding to u backlight values stored from the serial number bl_max to the serial number G+1 is less than or equal to the backlight power consumption margin of the (s−1)-th frame of image, the backlight value L (G+1) of the backlight block stored in the serial number G+1 is output as the peak driving threshold of the (s−1)-th frame of image.

Step S219: judging whether the initial backlight value $B_s$_current(n, p) of the (n, p)-th backlight block of the s-th frame of image is greater than or equal to the peak driving threshold of the (s−1)-th frame of image, and if so, executing step S220; If not, executing step S221.

For example, the peak driving threshold can be obtained through the step S218, and the initial backlight value $B_s$_current (n, p) of the (n, p)-th backlight block of the s-th frame of image can be obtained through the step S121 described in FIG. 4.

For example, in a case where the initial backlight value of the (n, p)-th backlight block is greater than or equal to the peak driving threshold of the (s−1)-th frame of image, the peak driving process is performed on the (n, p)-th backlight block to obtain the adjusted backlight value of the (n, p)-th backlight block. For example, if the backlight value of the (n, p)-th backlight block is less than the peak driving threshold of the (s−1)-th frame of image, the initial backlight value of the (n, p)-th backlight block is kept unchanged.

Step S220: performing the peak driving process on the (n, p)-th backlight block to obtain the adjusted backlight value of the (n, p)-th backlight block.

For example, the above operations can be performed according to the following formula:

$$B_s\_set(n,p)=K*B_s\_current(n,p),$$

where $B_s$_set(n, p) represents the adjusted backlight value after the peak driving process is performed on the (n, p)-th backlight block of the s-th frame of image, $B_s$_current(n, p) represents the initial backlight value before performing the peak driving process on the (n, p)-th backlight block of the s-th frame of image, and K is the peak driving adjustment coefficient.

For example, the step S220 is similar to the step S123 as shown in FIG. 4 and will not be repeated here.

Step S221: keeping the initial backlight value of the (n, p)-th backlight block unchanged, i.e. assigning the initial backlight value of the (n, p)-th backlight block to the adjusted backlight value of the (n, p)-th backlight block.

For example, the above operations can be performed according to the following formula:

$$B_s\_set(n,p)=B_s\_current(n,p),$$

where the peak driving adjustment coefficient K is equal to 1.

For example, the step S221 is similar to the step S124 as shown in FIG. 4 and will not be repeated here.

Step S222: outputting the adjusted backlight value of the (n, p)-th backlight block of the s-th frame of image.

For example, the respective adjusted backlight values of the plurality of backlight blocks of the s-th frame of image can be obtained through the step S220 or the step S221. For example, the respective adjusted backlight values of the plurality of backlight blocks of the s-th frame of image are output to the local dimming driving system of the LEDs backlight source as shown in FIG. 1B to drive the corresponding backlight blocks of the backlight source to emit light.

Figure 7:
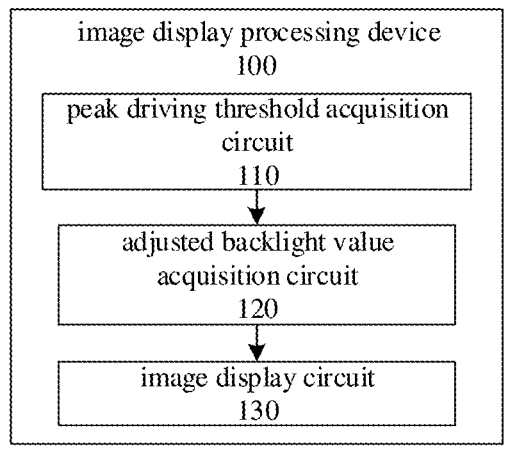
FIG. 7 is a schematic block diagram of an image display processing device provided by an embodiment of the present disclosure.

FIG. 7 is a schematic block diagram of an image display processing device provided by an embodiment of the present disclosure. The image display processing device 100 includes a peak driving threshold acquisition circuit 110, an adjusted backlight value acquisition circuit 120, and an image display circuit 130.

The peak driving threshold acquisition circuit 110 is configured to obtain a peak driving threshold of an (s−1)-th frame of image based on respective backlight values of a plurality of backlight blocks of the (s−1)-th frame of image after a local dimming process is performed on the (s−1)-th frame of image. For example, the peak driving threshold acquisition circuit 110 may implement the step S110 and the steps S211 to S218.

The adjusted backlight value acquisition circuit 120 is configured to acquire respective initial backlight values of the plurality of backlight blocks of an s-th frame of image, and perform a peak driving process on the respective initial backlight values of the plurality of backlight blocks of the s-th frame of image based on the peak driving threshold of the (s−1)-th frame of image, so as to obtain respective adjusted backlight values of the plurality of backlight blocks of the s-th frame of image. For example, the adjusted backlight value acquisition circuit 120 may implement the step S120 and the steps S218 to S221.

The image display circuit 130 is configured to display the s-th frame of image by using the respective adjusted backlight values of the respective backlight blocks of the s-th frame of image. For example, the image display circuit 130 may implement the step S130 and the step S222.

It should be noted that the image display processing device provided in the embodiments of the present disclosure may include more or less circuits, and the connection relationship among the circuits is not limited, and may be determined according to actual requirements. No limitation is imposed to the specific structure of each circuit, the circuit can include an analog component according to a principle of the circuit, or a digital chip, or other appropriate devices or components.

Technical effects of the image display processing device 100 may refer to technical effects of the image display processing method provided in the embodiment of the present disclosure and will not be described here again.

Another embodiment of the present disclosure also provides an image display processing device configured to execute the above image display processing method of the embodiment of the present disclosure. For example, the image display processing device includes a processor, a storage (memory), and one or a plurality of computer program modules. For example, the processor is connected with the storage by a bus system. For example, the one or more computer program modules are stored in the storage. For example, the one or more computer program modules 221 include one or more instructions that are executable by a computer used for achieving the image display processing method. For example, the instructions of the one or more computer program modules can be executed by the processor. For example, the bus system is a serial or parallel communication bus, etc., and no limitation is imposed in this aspect in the embodiments of the present disclosure.

Figure 8:
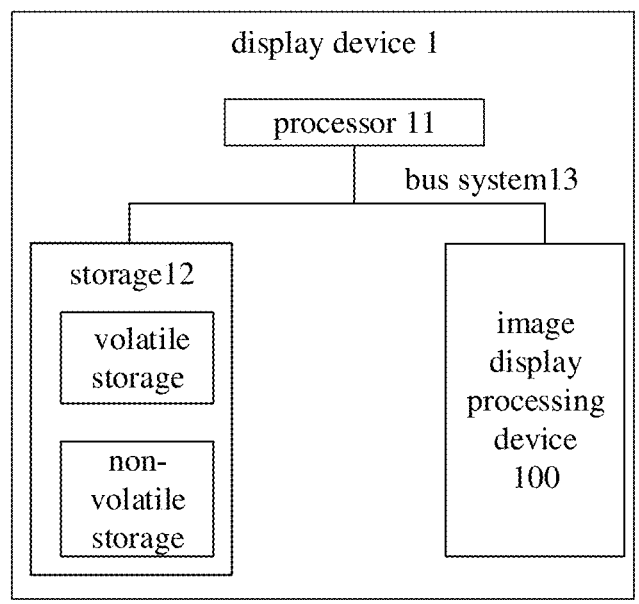
FIG. 8 is a schematic diagram of a display device provided by an embodiment of the present disclosure.

An embodiment of the present disclosure also provide a display device 1. The display device 1 may include the image display processing device 100 provided by any of the embodiments of the present disclosure. For example, the image display processing device 100 can synchronously transmit the backlight data and the peak driving data to improve the display quality of the display panel. For example, the display device 1 may include the image display processing device 100 as shown in FIG. 7 or an image display processing device provided by another embodiment of the present disclosure may be included by the display device 1. FIG. 8 is a schematic block diagram of a display device 1 provided by an embodiment of the present disclosure. For example, as shown in FIG. 8, the display device 1 includes a processor 11, a storage (memory) 12, and an image display processing device 100.

For example, the display device 1 may be a thin film transistor liquid crystal display device, an electronic paper display device, or the like. For example, the display device is a VR device, such as a VR helmet or the like, and the embodiments of the present disclosure are not limited to this case. For example, because the grayscales of images in adjacent frames in the VR device change slowly, the backlight values of a previous frame of image can be used as a reference for the backlight values of a current frame of image.

For example, the components are interconnected by the bus system 13 and/or other coupling mechanisms (not shown in figures). For example, the bus system 13 may be a serial, parallel communication bus, etc., and the embodiments of the present disclosure do not limit to this case. It should be noted that the components and structures of the display device 1 as shown in FIG. 8 are merely exemplary and not limiting, and the display device 1 may have other components and structures as needed.

For example, the processor 11 may be a central processing unit (CPU) or other forms of processing units having a data processing ability and/or instruction execution ability. For example, the processor 210 may be a general processor or a dedicated processor, and can control other components in the image processing device 200 to achieve the expected functions. For example, the storage 12 can include one or more computer program products, and the computer program products includes a computer-readable storage media in various forms. For example, the storage 12 is a volatile storage and/or a non-volatile storage. The volatile storage, for example, includes a random access memory (RAM) and/or a cache memory, etc. The non-volatile storage, for example, includes a read-only memory (ROM), a hard disk, and a flash memory, etc. One or more computer program instructions can be stored in the computer-readable storage medium, and the processor 11 can run or execute the program instructions to realize the functions (which are to be realized by the processor 210) in the embodiments of the present disclosure and/or other expected functions, such as acquiring the peak driving threshold and acquiring the respective adjusted backlight values, etc. Various applications and data, such as a preset threshold and various data used and/or generated by application programs, etc., can also be stored in the computer-readable storage medium.

It should be noted that in order to be clear and concise, the present embodiment of the present disclosure does not illustrate all components of the display device 1. Those skilled in the art can provide and arrange other components, which are not illustrated in the figures, of the display device 1 according to actual requirements to achieve necessary functions of the display device 1. The embodiments of the present disclosure are not limited thereto.

Technical effects of the display device 1 can be referred to the technical effects of the image display processing method for a display device provided by the embodiments of the present disclosure, and details are not described here again.

An embodiment of the present disclosure also provide a non-volatile storage medium. For example, the non-volatile storage medium can store a computer-readable instruction non-transitorily, and in a case where the computer-readable instruction stored non-transitorily is executed by a computer (including a processor), the image display processing method provided by any one of the embodiments of the present disclosure may be executed.

For example, the non-volatile storage medium is any combination of one or more computer-readable storage media. For example, one computer-readable storage medium includes computer-readable program codes used for obtaining a peak driving threshold, and another computer-readable storage medium includes computer-readable program codes used for obtaining respective adjusted backlight values. For example, in a case where the program code is read by the computer, the program code stored in the computer-readable storage medium is executed by the computer, and for example, the image display processing method provided by any one of the embodiments of the present disclosure is executed.

For example, the storage media may include a memory card of a smart phone, a storage component of a tablet, a hard disk of a personal computer, a random access memory (RAM), a read-only memory (ROM), a erasable programmable read-only memory (EPROM), a portable compact disk read-only memory (CD-ROM), a flash memory, or any combination of the above-mentioned storage media, or other suitable storage media.

The following should be noted:

(1) Only the structures involved in the embodiments of the present disclosure are illustrated in the drawings of the embodiments of the present disclosure, and other structures can refer to usual designs.

(2) The embodiments and features in the embodiments of the present disclosure may be combined in case of no conflict to obtain new embodiments.

The foregoing merely are exemplary embodiments of the present disclosure, and not intended to define the scope of the present disclosure, and the scope of the present disclosure is determined by the appended claims.

What is claimed is:

1. An image display processing method for a display device, wherein the display device comprises a backlight unit, the backlight unit comprises a plurality of backlight blocks and is configured to be driven by a local dimming mode, and the image display processing method comprises:
obtaining a peak driving threshold of an (s-1)-th frame of image based on respective backlight values of the plurality of backlight blocks of the (s-1)-th frame of image after a first local dimming process is performed on the (s-1)-th frame of image;
acquiring respective initial backlight values of the plurality of backlight blocks of an s-th frame of image, and performing a peak driving process on the respective initial backlight values of the plurality of backlight blocks of the s-th frame of image based on the peak driving threshold of the (s-1)-th frame of image, so as to obtain respective adjusted backlight values of the plurality of backlight blocks of the s-th frame of image; and
displaying the s-th frame of image by using the respective adjusted backlight values of the plurality of backlight blocks of the s-th frame of image, wherein s is an integer greater than 1;
the method further comprises:
acquiring a maximum backlight value of the plurality of backlight blocks of the (s-1)-th frame of image;
judging whether the maximum backlight value of the plurality of backlight blocks of the (s-1)-th frame of image is greater than or equal to a preset threshold; and
judging whether a total backlight power consumption of the (s-1)-th frame of image is less than a conventional backlight power consumption,
wherein in a case where the maximum backlight values of the respective backlight blocks of the (s-1)-th frame of image is great than or equal to the preset threshold and the total backlight power consumption of the (s-1)-th frame of image is less than the conventional backlight power consumption, obtaining the peak driving threshold of the (s-1)-th frame of image based on the backlight values of the respective backlight blocks of the (s-1)-th frame of image after the first local dimming process is performed on the (s-1)-th frame of image is performed, and otherwise, the peak driving process on the respective initial backlight values of the plurality of backlight blocks of the s-th frame of image is not performed.

2. The image display processing method according to claim 1, wherein obtaining the peak driving threshold of the (s-1)-th frame of image based on the respective backlight values of the plurality of backlight blocks of the (s-1)-th frame of image after the first local dimming process is performed on the (s-1)-th frame of image comprises:
acquiring a backlight power consumption margin of the (s-1)-th frame of image based on the respective backlight values of the plurality of backlight blocks of the (s-1)-th frame of image after the first local dimming process is performed on the (s-1)-th frame of image; and
acquiring the peak driving threshold of the (s-1)-th frame of image based on the backlight power consumption margin of the (s-1)-th frame of image.

3. The image display processing method according to claim 2, wherein acquiring the backlight power consumption margin of the (s-1)-th frame of image based on the respective backlight values of the plurality of backlight blocks of the (s-1)-th frame of image after the first local dimming process is performed on the (s-1)-th frame of image comprises:
acquiring a total backlight power consumption of the (s-1)-th frame of image based on the respective backlight values of the plurality of backlight blocks of the (s-1)-th frame of image after the first local dimming process is performed on the (s-1)-th frame of image.

4. The image display processing method according to claim 3, wherein acquiring the backlight power consumption margin of the (s-1)-th frame of image based on the respective backlight values of the plurality of backlight blocks of the (s-1)-th frame of image after the first local dimming process is performed on the (s-1)-th frame of image further comprises:
acquiring the backlight power consumption margin of the (s-1)-th frame of image based on the total backlight power consumption of the (s-1)-th frame of image and the conventional backlight power consumption of the backlight unit.

5. The image display processing method according to claim 2, wherein acquiring the peak driving threshold of the (s-1)-th frame of image based on the backlight power consumption margin of the (s-1)-th frame of image comprises:

arranging the respective backlight values of the plurality of backlight blocks of the (s-1)-th frame of image in an ascending order to obtain a first sequence, and acquiring the peak driving threshold of the (s-1)-th frame of image according to a following formula:

$$\sum_{x=G}^{b1\_max} (K-1)L(x) \times N(x) \le M(s), \text{ and}$$

$$\sum_{x=G-1}^{b1\_max} (K-1)L(x) \times N(x) > M(s),$$

where K represents a peak driving adjustment coefficient, G represents a serial number of each of the respective backlight values in the first sequence, M(s) represents the backlight power consumption margin of the (s-1)-th frame of image, L(x) represents a backlight value with a serial number x in the respective backlight values of the plurality of backlight blocks of the (s-1)-th frame of image, N(x) represents a number of backlight blocks of which the backlight value is L(x) in the plurality of backlight blocks of the (s-1)-th frame of image, and b1 max represents a serial number of a maximum backlight value of the plurality of backlight blocks of the (s-1)-th frame of image in the first sequence.

6. The image display processing method according to claim 5, wherein the backlight power consumption margin of the (s-1)-th frame of image is expressed as:

$$M(s) = PW(SD) - PW_{s-1}(LD),$$

where $PW_{s-1}(LD)$ represents a total backlight power consumption of the (s-1)-th frame of image, and PW(SD) represents the conventional backlight power consumption of the backlight unit.

7. The image display processing method according to claim 6, wherein the total backlight power consumption of the (s-1)-th frame of image is expressed as:

$$PW_{s-1}(LD) = \sum_{i=1}^{I} \sum_{j=1}^{J} B_{s-1}(i,j),$$

where $B_{s-1}(i, j)$ represents a backlight value of an (i, j)-th backlight block of the (s-1)-th frame of image, $1 \le i \le I$, $1 \le j \le J$, and I and J respectively represent a number of rows and a number of columns of an array in which the plurality of backlight blocks are arranged and are both integers greater than 1.

8. The image display processing method according to claim 7, wherein $B_s\_1(i, j)$ is obtained according to grayscales of a plurality of pixels corresponding to the (i, j)-th backlight block of the (s-1)-th frame of image.

9. The image display processing method according to claim 8, wherein the conventional backlight power consumption of the backlight unit is expressed as:

$$PW(SD) = Hm * I * J,$$

where Hm represents a maximum conventional backlight value.

10. The image display processing method according to claim 1, wherein acquiring the respective initial backlight values of the plurality of backlight blocks of the s-th frame of image, and performing the peak driving process on the respective initial backlight values of the plurality of backlight blocks of the s-th frame of image based on the peak driving threshold of the (s-1)-th frame of image, so as to obtain the adjusted backlight values of the respective backlight blocks of the s-th frame of image, comprises:

acquiring the respective initial backlight values of the plurality of backlight blocks of the s-th frame of image after a second local dimming process is performed on the s-th frame of the image;

judging whether an initial backlight value of an (n, p)-th backlight block of the s-th frame of image is greater than or equal to the peak driving threshold of the (s-1)-th frame of image;

in a case where the initial backlight value of the (n, p)-th backlight block is greater than or equal to the peak drive threshold of the (s-1)-th frame of image, performing the peak driving process on the (n, p)-th backlight block to obtain the adjusted backlight value of the (n, p)-th backlight block; and in a case where the backlight value of the (n, p)-th backlight block is less than the peak driving threshold of the (s-1)-th frame of image, keeping the initial backlight value of the (n, p)-th backlight block unchanged, wherein $1 \le n \le I$, $1 \le p \le J$, I and j respectively represent a number of rows and a number of columns of an array in which the plurality of backlight blocks are arranged.

11. The image display processing method according to claim 10, wherein performing the peak driving process on the (n, p)-th backlight block to obtain the adjusted backlight value of the (n, p)-th backlight block is performed according to a following formula:

$$B_s\_set(n,p) = K * B_s\_current(n,p),$$

where $B_s\_set(n, p)$ represents the adjusted backlight value after the peak driving process is performed on the (n, p)-th backlight block of the s-th frame of image, $B_s\_current(n, p)$ represents the initial backlight value before performing the peak driving process on the (n, p)-th backlight block of the s-th frame of image, and K is a peak driving adjustment coefficient.

12. An image display processing device, comprising:

a peak driving threshold acquisition circuit, configured to obtain a peak driving threshold of an (s-1)-th frame of image based on respective backlight values of a plurality of backlight blocks of the (s-1)-th frame of image after a local dimming process is performed on the (s-1)-th frame of image;

an adjusting backlight value acquisition circuit, configured to acquire respective initial backlight values of the plurality of backlight blocks of an s-th frame of image, and perform a peak driving process on the respective initial backlight values of the plurality of backlight blocks of the s-th frame of image based on the peak driving threshold of the (s-1)-th frame of image, so as to obtain respective adjusted backlight values of the plurality of backlight blocks of the s-th frame of image; and an image display circuit, configured to display the s-th frame of image by using the respective adjusted backlight values of the respective backlight blocks of the s-th frame of image, wherein s is an integer greater than 1;

wherein the image display processing device is configured to:

acquire a maximum backlight value of the plurality of backlight blocks of the (s-1)-th frame of image;

judge whether the maximum backlight value of the plurality of backlight blocks of the (s-1)-th frame of image is greater than or equal to a preset threshold; and judge whether a total backlight power consumption of the (s-1)-th frame of image is less than a conventional backlight power consumption of a backlight unit, and obtain the peak driving threshold of the (s-1)-th frame of image based on the backlight values of the respective backlight blocks of the (s-1)-th frame of image after the first local dimming process is performed on the (s-1)-th frame of image is performed, wherein in a case where the maximum backlight values of the respective backlight blocks of the (s-1)-th frame of image is great than or equal to the preset threshold and the total backlight power consumption of the (s-1)-th frame of image is less than the conventional backlight power consumption, and otherwise, not perform the peak driving process on the respective initial backlight values of the plurality of backlight blocks of the s-th frame of image.

13. An image display processing device, comprising:
a processor;
a storage; and
one or a plurality of computer program modules, wherein the one or the plurality of computer program modules are stored in the storage and are configured to be executed by the processor, and the one or the plurality of computer program modules comprise an instruction used for achieving the image display processing method according to claim 1.

14. A display device, comprising the image display processing device according to claim 12.

15. A display device, comprising the image display processing device according to claim 13.

16. A non-volatile storage medium, storing a computer-readable instruction non-transitorily,
wherein the image display processing method according to claim 1 is executed in a case where the computer-readable instruction stored non-transitorily is executed by a computer.

* * * * *